United States Patent [19]

Inoue

[11] Patent Number: 5,018,080
[45] Date of Patent: May 21, 1991

[54] PRINTER

[75] Inventor: Yasuhiro Inoue, Kawasaki, Japan

[73] Assignee: Fujitsu Limited, Kawasaki, Japan

[21] Appl. No.: 547,196

[22] Filed: Jul. 3, 1990

[30] Foreign Application Priority Data

Jul. 3, 1989 [JP] Japan .................................. 1-172171

[51] Int. Cl.⁵ .............................................. G06K 15/00
[52] U.S. Cl. .................................... 364/519; 364/900; 364/930
[58] Field of Search ........ 364/519, 518, 930 MS File, 364/235 MS File, 931.11 MS File, 931 MS File, 955 MS File, 255.1 MS File; 358/448, 468; 346/154

[56] References Cited

U.S. PATENT DOCUMENTS 4,807,044 2/1989 Kikuchi et al. .................... 358/448

Primary Examiner—Arthur G. Evans
Attorney, Agent, or Firm—Staas & Halsey

[57] ABSTRACT

A printer for printing an input data from an external device such as a personal computer or a facsimile transmitter through a cable or telephone line, having a function of printing an input data or fixed data which can be formed by using specific buttons provided on the control panel of the printer in a reversed form being upside down and left to right when a reverse printing button provided on the control panel is ON, whereby it is easy to check the printed documents when the printer is installed on the wall.

11 Claims, 17 Drawing Sheets

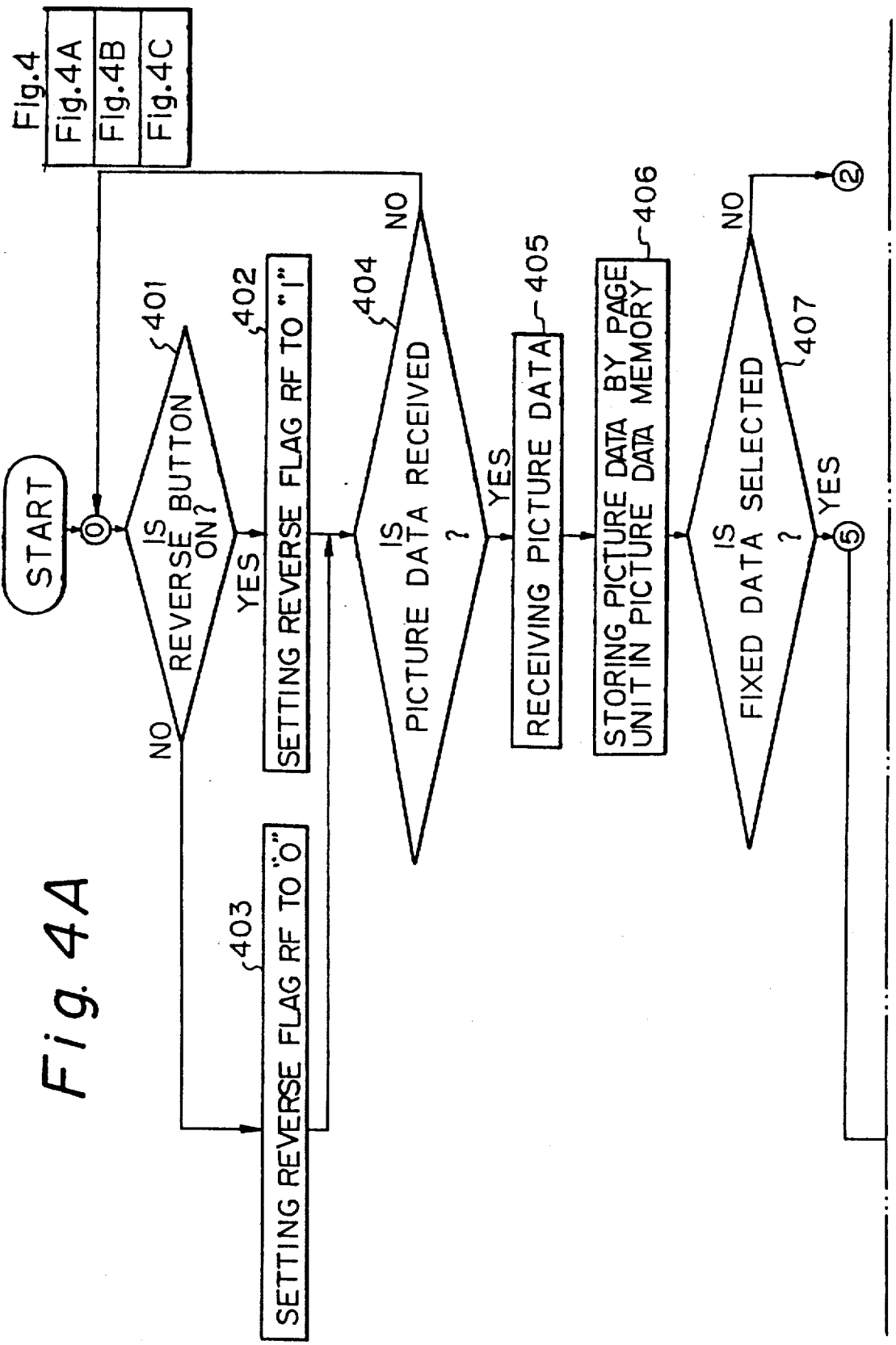

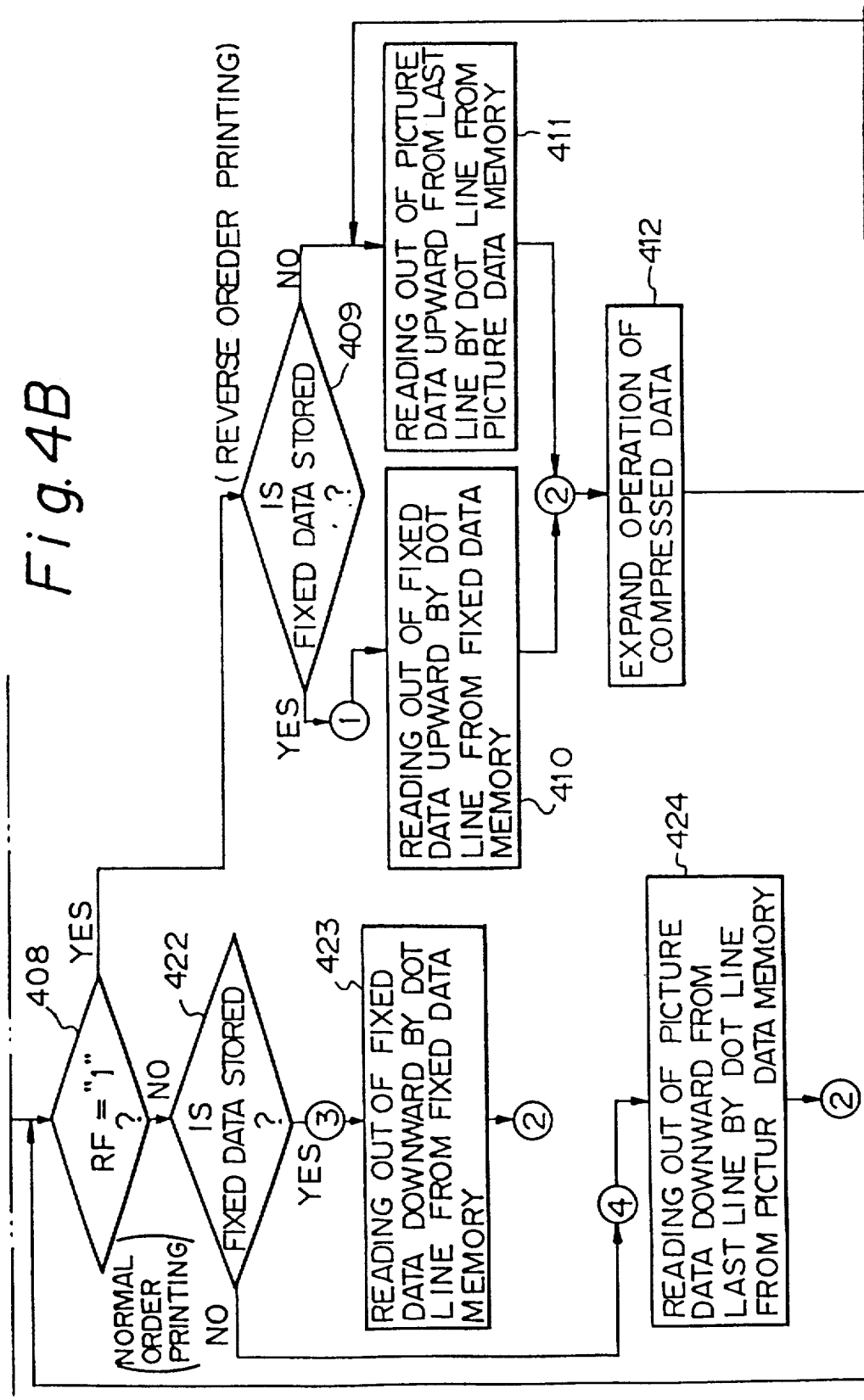

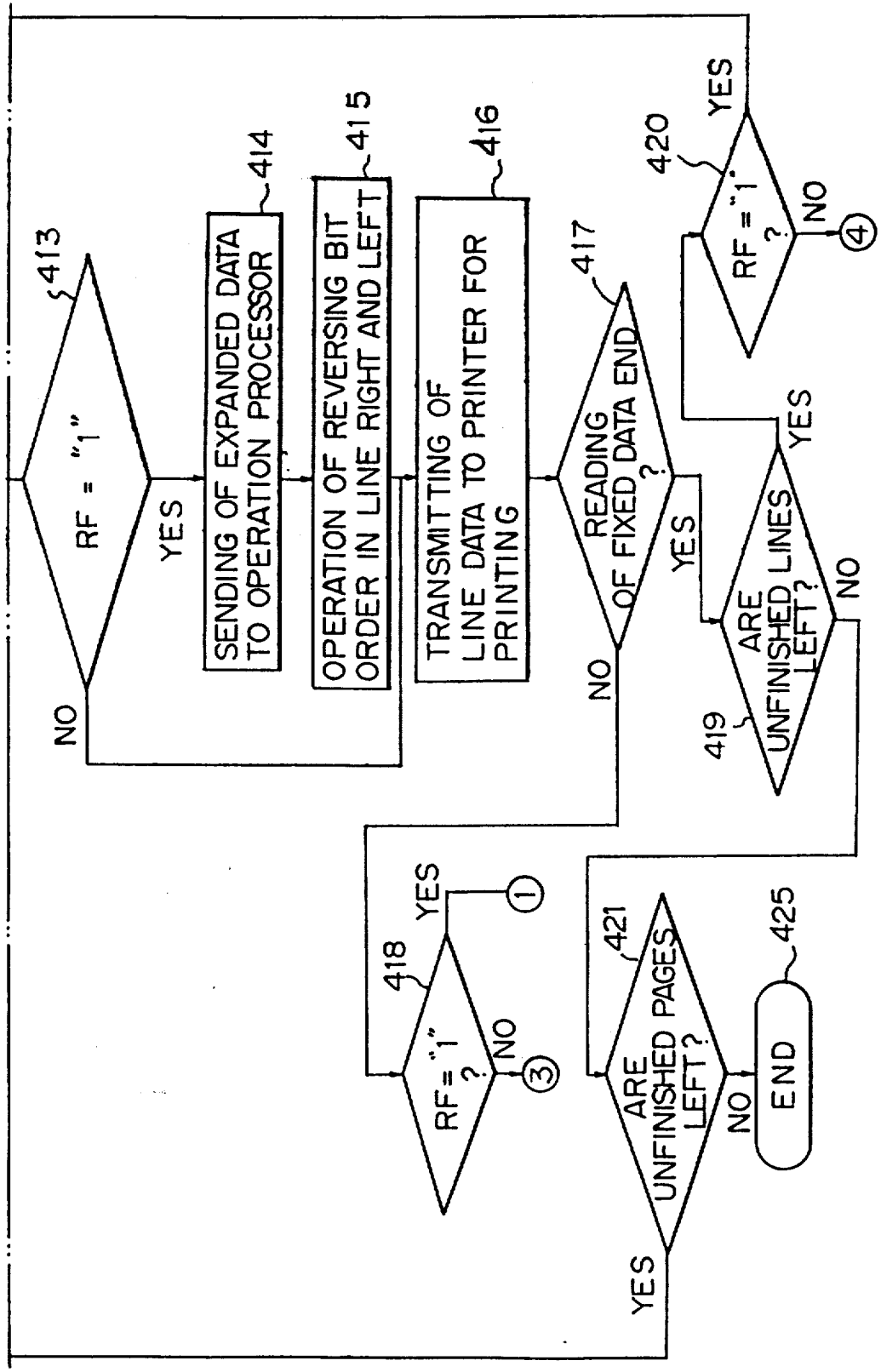

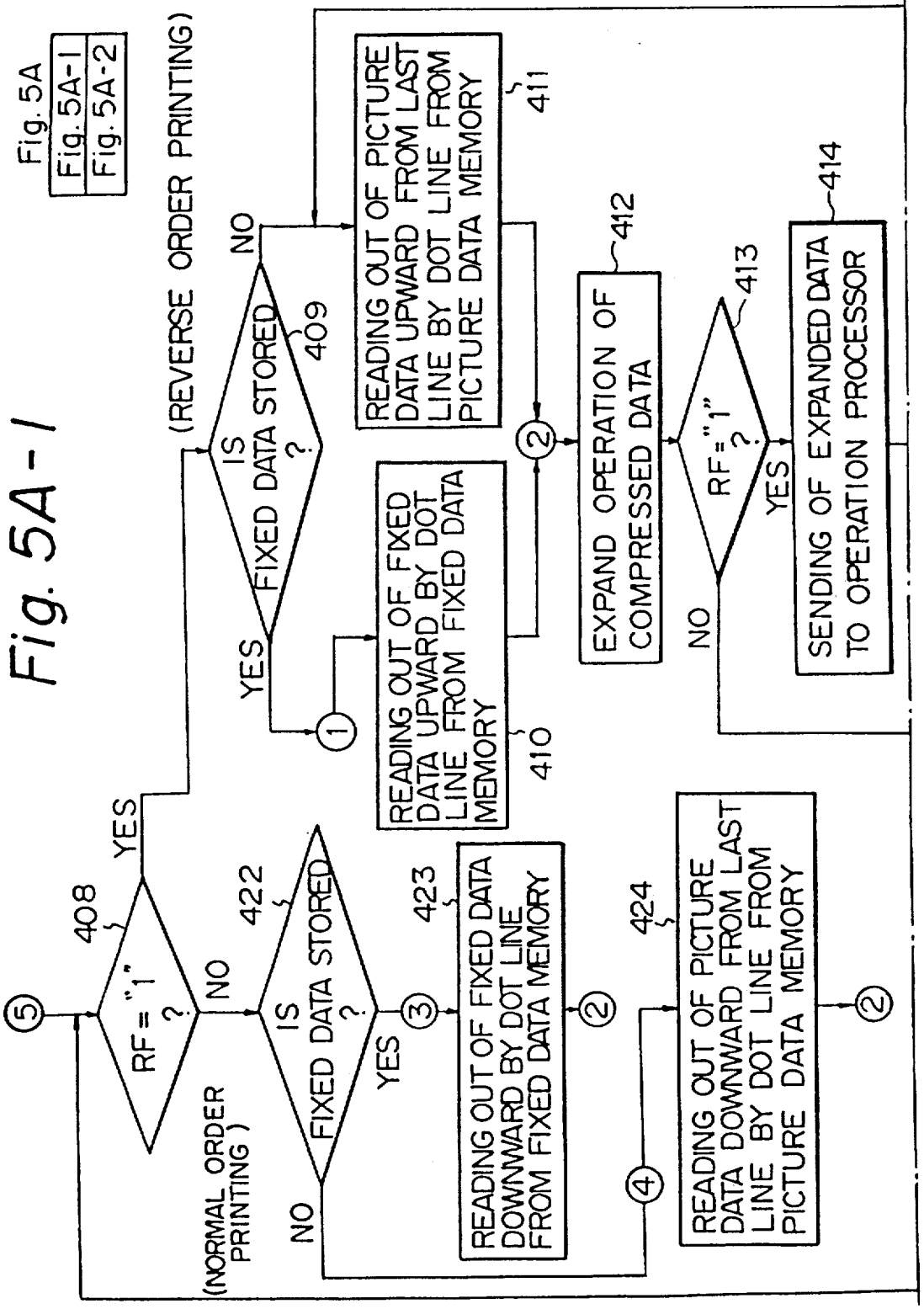

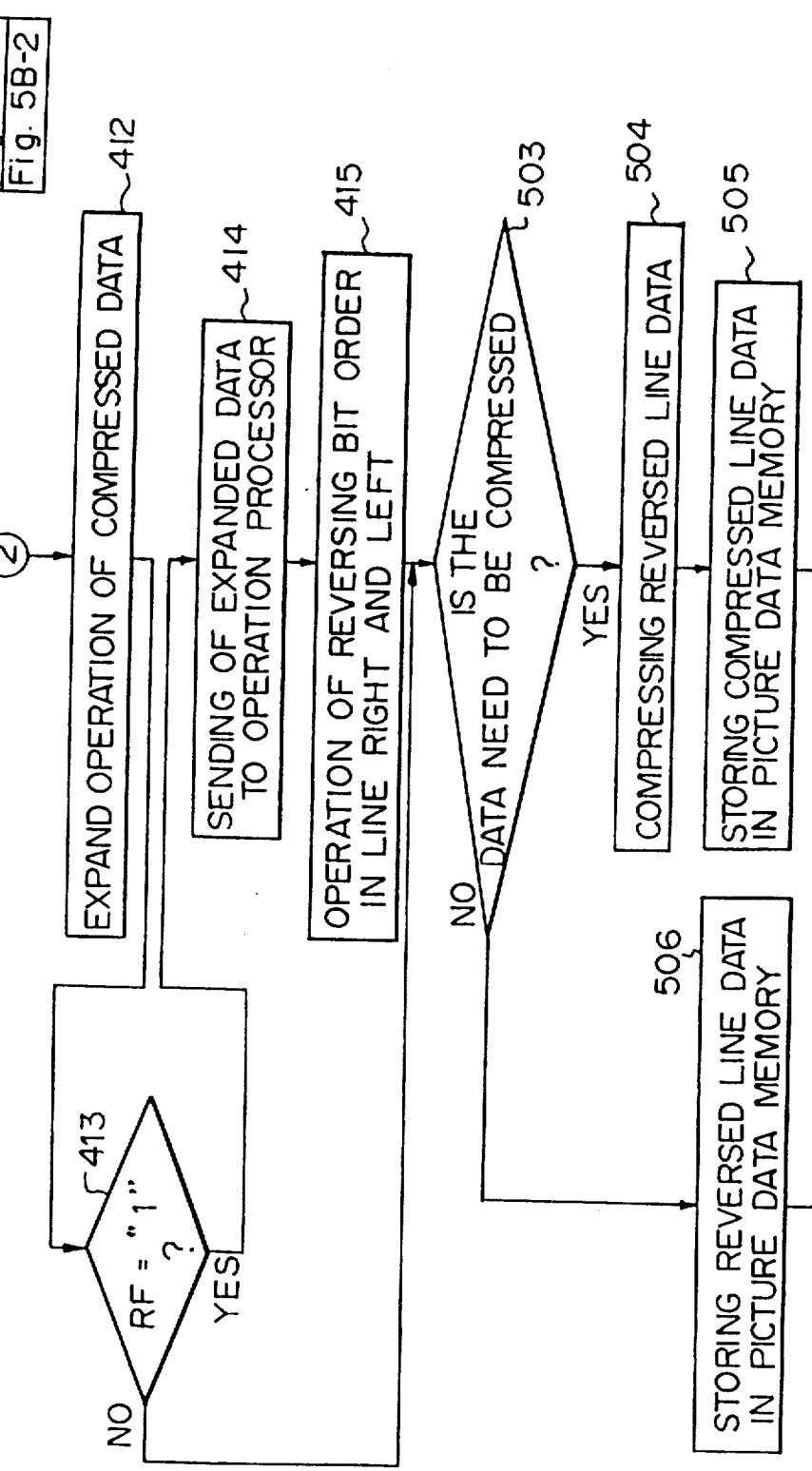

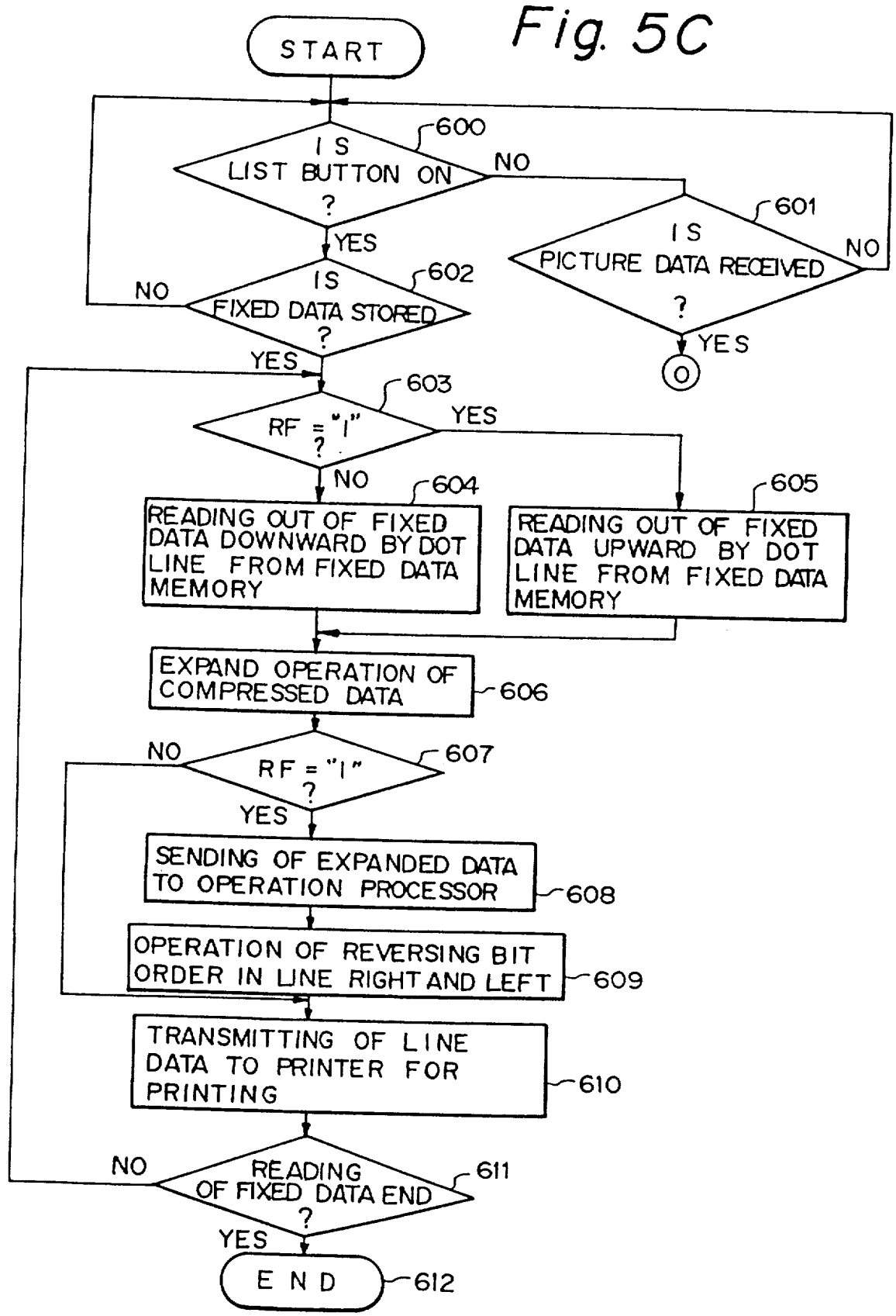

Fig. 7

| Step | 1 | 2 | 3 | 4 | 5 | 6 | 7 | 8 | Description |
|---|---|---|---|---|---|---|---|---|---|
| STEP 1 | A | B | C | D | E | F | G | H | A~H SHOW 1 OR 0 |
| STEP 2 | 0 | 0 | 0 | 0 | 0 | 0 | 0 | A | SHIFT BY 7 BITS TO RIGHT |
| STEP 3 | 0 | 0 | 0 | 0 | 0 | A | B | C | SHIFT BY 5 BITS TO RIGHT |
| STEP 4 | 0 | 0 | 0 | 0 | 0 | 0 | 1 | 0 | |
| STEP 5 | 0 | 0 | 0 | 0 | 0 | 0 | B | 0 | MAKE LOGICAL "AND" OF STEP 3 AND STEP 4 |
| STEP 6 | 0 | 0 | 0 | 0 | 0 | 0 | B | A | MAKE LOGICAL "OR" OF STEP 5 AND STEP 2 |
| STEP 7 | 0 | 0 | 0 | A | B | C | D | E | SHIFT BY 3 BITS TO RIGHT |
| STEP 8 | 0 | 0 | 0 | 0 | 0 | 1 | 0 | 0 | |
| STEP 9 | 0 | 0 | 0 | 0 | 0 | C | 0 | 0 | MAKE LOGICAL "AND" OF STEP 7 AND STEP 8 |
| STEP 10 | 0 | 0 | 0 | 0 | 0 | C | B | A | MAKE LOGICAL "OR" OF STEP 6 AND STEP 9 |

Fig. 9A

P0～P7 SHOW 1 OR 0

| P0 | P1 | P2 | P3 | P4 | P5 | P6 | P7 |

↑ 1 BIT LINE DATA IN POSITIVE ORDER

Fig. 9B

| P7 | P6 | P5 | P4 | P3 | P2 | P1 | P0 |

↑ 1 BIT LINE DATA IN REVERSE ORDER OF LEFT AND RIGHT

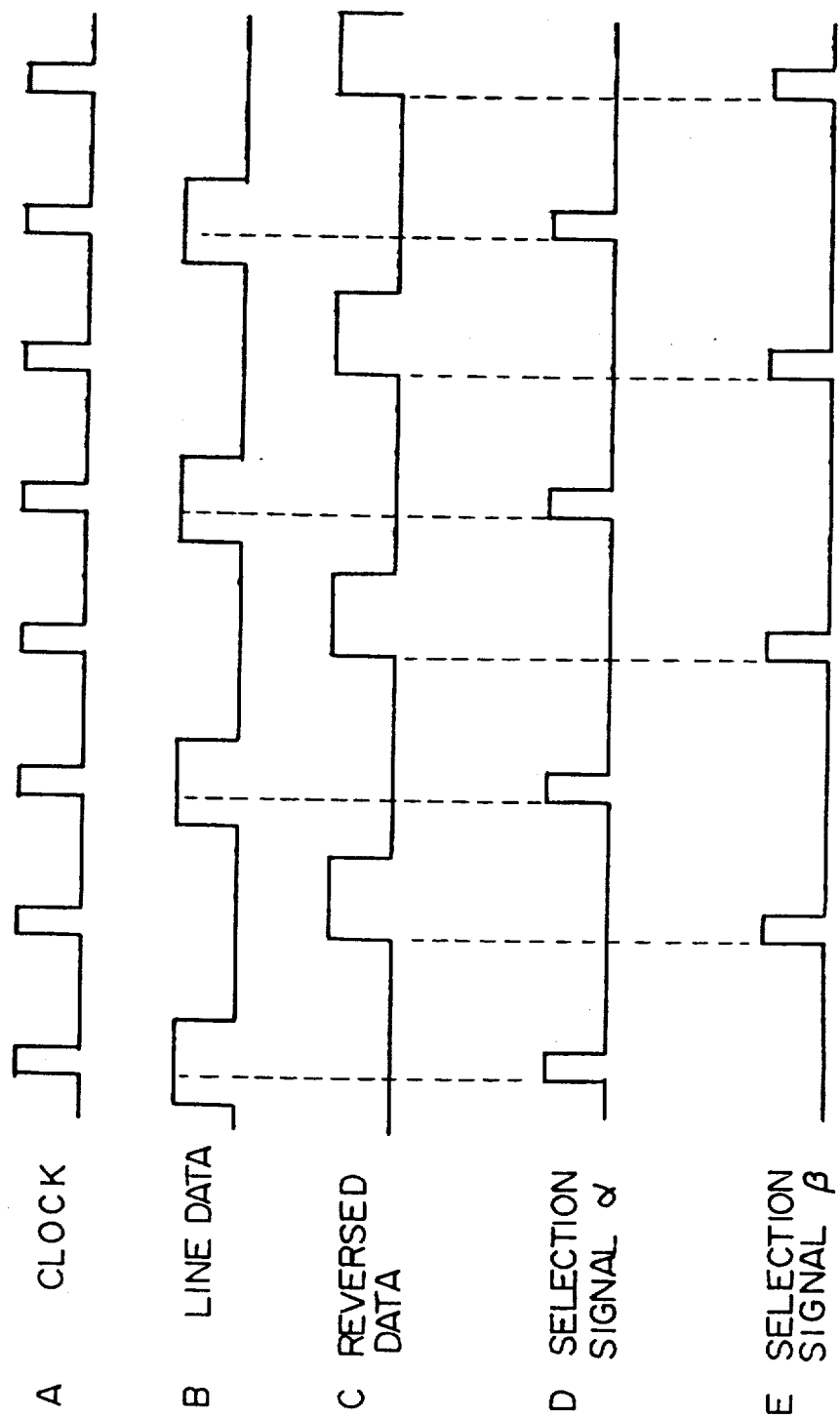

PRINTER

BACKGROUND OF THE INVENTION

Field of the invention

The present invention relates to a printer for printing picture data input from an external device and in particular to a printer capable of printing line by line in an upward direction from the lowest line of the printing paper.

Description of the Related Art

Generally, the printer in a recording part of a facsimile transmitting / receiving system hereinafter referred as a facsimile system) or a printer connected to a personal computer and so on is used for printing the picture data being transmitted to it. In these printers, data is printed in the same order as the order being transmitted via telephone line or printer cable, and printed documents are sent out from the printer starting from the head portion of the printing paper.

However, in the conventional facsimile system, for example, when documents are read to be transmitted from the top line of the page by the facsimile device of the transmitting side, and if the facsimile device of the receiving side is installed on the wall, the received documents are sent out from the bottom of the facsimile machine of the receiving side with printed data upside down. In other words, if the documents are transmitted so to start to read from the top line of the documents by a facsimile transmitter, transmitted documents are sent out hanging down from the lower exit portion of a facsimile receiver, and accordingly printed characters and the like are difficult to read because the printed documents are sent out upside down. For this reason, it is desired to provide an apparatus for enabling easier checking of the printed documents which are sent out from the facsimile receiver installed on the wall.

SUMMARY OF THE INVENTION

The object of the present invention is to provide a printer capable of printing in an upward direction line by line starting from a lowest line of a page, and sending out such printed pages bottom-first to make the documents easy to read.

According to the present invention, a printer consists of print specifying means provided on the control panel of the printer for specifying the printing mode of a page, upright image printing mode printing downward from the first line of the page or reversed image printing mode printing upward from the last line of the page; a printing data storing means having a storage region for storing at least one page of printing data, storing that one page of printing data a unit; a printing data reading means for reading out a printing data by a dot line unit from the printing data storing means; a printing direction specifying means for specifying the printing order of the dot line unit from the printing data reading means in accordance with an instruction from the print specifying means; a printing data processing means for reversing the data order of first to last to last to first for the data read out by the printing data reading means from the printing mode is instructed by the print specifying means; and a printing means for printing the printing data on a printing medium.

Thus, when a reverse order printing mode is set at the facsimile receiver, at least one page of printing data received in page units is stored in the memory means, and stored one page of printing data is read out by a last-in-first-out procedure (LIFO), and then the conversion process of reversing the data order from left to right to right to left for one line of the printing data. The converted printing data is printed on the printing medium by the printing means in the converted order. In the aforegoing manner, the medium on which the printing data is printed by reversing the ordinary orders of top to bottom in pages and left to right in respective lines, is sent out from the lower end of the facsimile receiver, and thus better readability is obtained in checking or reading of the printed documents.

BRIEF DESCRIPTION OF THE DRAWINGS

The present invention will be more clearly understood from the description below with reference to the accompanying drawings, wherein:

FIGS. 4A to 4C are flow charts of one embodiment according to the present invention;

FIGS. 5A-1 and 5A-2 are flow charts of a modified embodiment according to the present invention;

FIGS. 5B-1 and 5B-2 are flow charts of a modified embodiment according to the present invention;

FIG. 5C is a flow chart of a modified embodiment according to the present invention;

FIG. 7 is a table illustratins a data reversing operation of one embodiment in the present invention;

FIGS. 9A and 9B are illustrations showing an operation of the diagram shown in FIG. 8 according to the present invention;

FIGS. 10A to 10E are timing charts showing an operation of the circuit shown in FIG. 8 according to the present invention.

DESCRIPTION OF THE PREFERRED EMBODIMENTS

Before describing the preferred embodiments of the present invention, an explanation will be given of the conventional facsimile system shown in FIGS. 1 and 2.

Figure 1:
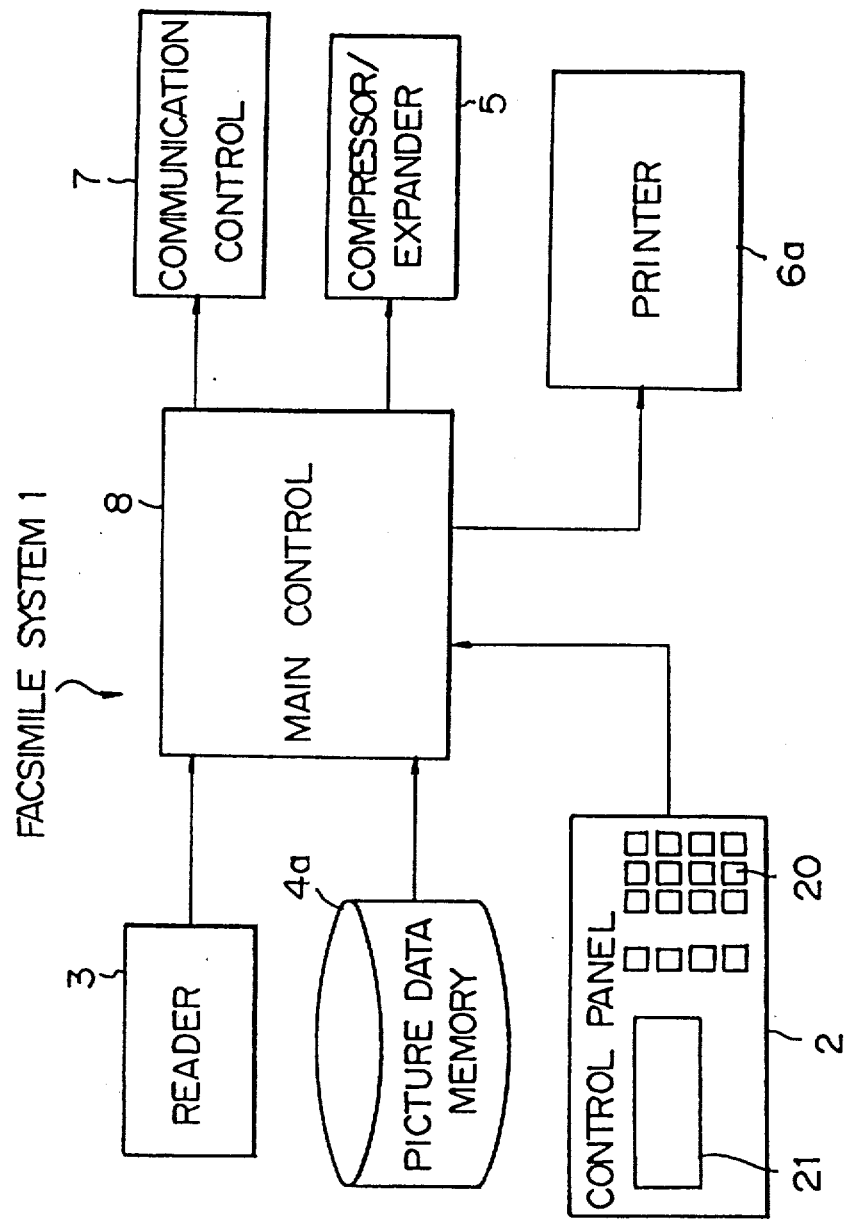
FIG. 1 is a block diagram illustrating a conventional facsimile system.

FIG. 1 is a block diagram illustrating a prior art facsimile system 1 which is provided with a function of transmitting and receiving. The operation of transmitting and receiving thereof will now be explained.

In FIG. 1, reference numeral 2 denotes a control panel 2 including a ten-key (numerical key) key pad 20 and a display 21, the ten-key key pad 20 is used for inputting addressed telephone numbers, a display 21 is used for displaying input data and the like, reference numeral 3 denotes a reader having an image sensor for reading documents to be transmitted, 4a denotes a picture data memory, 5 denotes a compressor/expander, 6a denotes a printer, 7 denotes a communication control, and reference numeral 8 denotes a main control.

Figure 2:
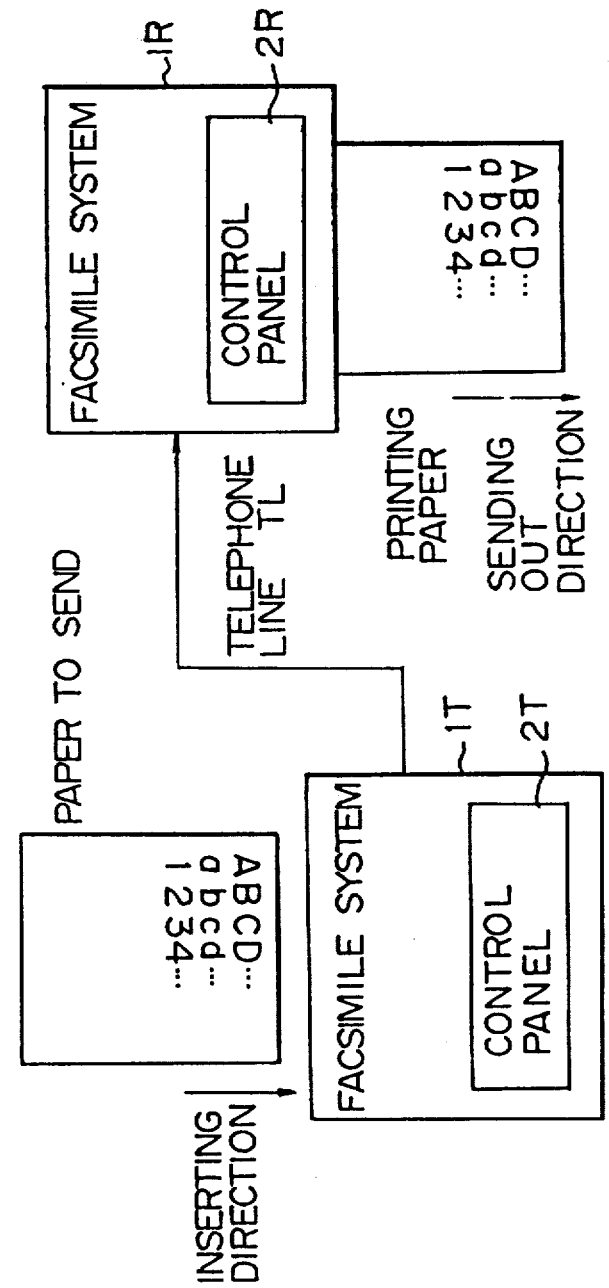
FIG. 2 is a illustration for explaining the data transmission between a conventional facsimile transmitter and a receiver via a telephone line.

FIG. 2 is an illustration for explaining the data transmission between a conventional facsimile transmitter and a receiver shown in FIG. 1 via a telephone line. From the above described constitution, if documents are put in the reader 3 and the addressed telephone number is input by dialing through the use of the ten-key key pad 20 on the control panel 2 of the facsimile trnsmitter 1T, the addressed side facsimile receiver 1R is called. When the facsimile transmitter 1T and the addressed facsimile receiver 1R is connected via the telephone line, a transmission push button is depressed to transmit the documents. In this manner, on completion of the procedure in advance for transmitting-/receiving, the reader 3 starts to read the documents, the thus input picture data is temporarily stored in the picture data memory 4a as is (or as compressed by the compressor/expander). Then, the temporarily stored picture data is sequentially read out to be sent directly to the compressor/expander 5 at respective lines (or the already compressed stored picure data passes the compressor/expander 5). The resultant compressed picture data is divided into lines, blocks, or pages, and is delivered from the communication control 7 to a receiver side.

The facsimile receiver 1R receives the picture data at the communication control 7 to then temporarily store the data in the picture data memory 4a (the received picture data is divided into lines, blocks, or pages). The stored picture data is sequentially read out, expanded at the compressor/expander 5 if required, and printed on printing papers by the printer 6a. Thus, received documents are completed by respective pages.

In the above described operation, the picture data is printed on the printing papers in the same order as that of reading from the original documents. The printed papers are sent out so that the head of the document pages appears first as shown in FIG. 2. The main control 8 performs the above described operation.

The conventional facsimile system, in general, reads out the transmitted documents so as to make the top end of the pages the beginning in printing. As a result, in printing, the received data is printed as shown in FIG. 2 in the order of from the upper left portion to the right portion in such a way that the head of printed pages corresponds to that of the original documents. However, for example, in the case that the facsimile receiver 1R is installed on the wall, the printed papers are sent out hanging down from the facsimile receiver, and the printed documents appear upside down, and thereby result in difficulty in reading. In particular, when rolled paper is sent out without being cut, it is drawback for operators to twist the printed documents or to twist their body or neck, to easily check the papers.

Therefore, in order to improve readability of the documents, it is desired to reverse the above described printing order, that is, to reverse the ordinary order of top to bottom in pages and left to right in lines.

Figure 3:
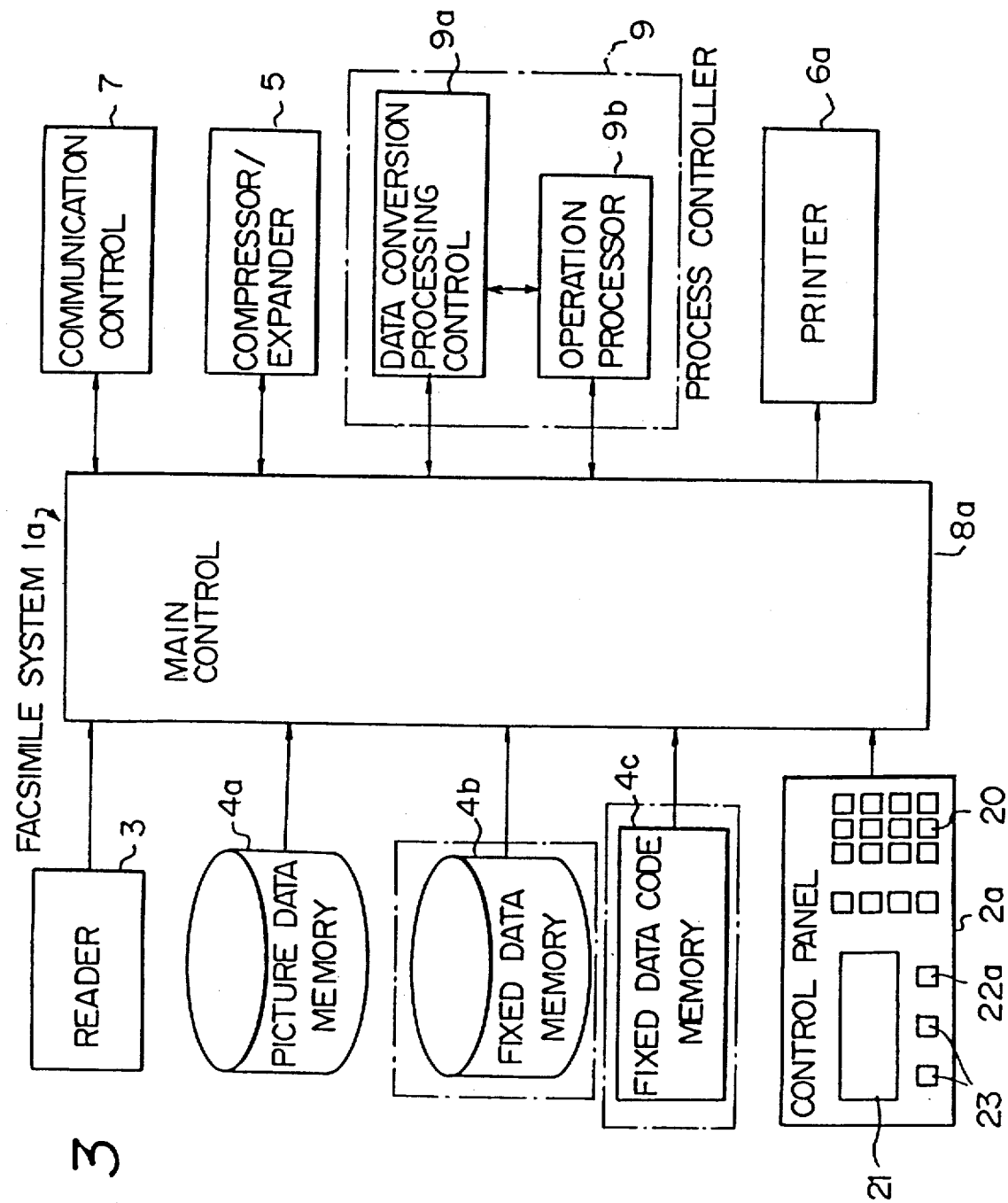
FIG. 3 is a block diagram illustrating one embodiment of the present invention.

FIG. 3 is a block diagram illustrating a facsimile system 1a according to the present invention, wherein identical characters or symbols respectively designate the same portion or unit throughout. In FIG. 3, portions disagreeing to FIG. 1 are surrounded by one-dot-dash-lines.

In FIG. 3, reference numeral 2 denotes a control panel 2a including a ten-key (numerical key) key pad 20 and a display 21, the ten-key key pad 20 is used for inputting addressed telephone numbers, a display 21 is used for displaying input data and the like, reference numeral 3 denotes a reader having an image sensor fo reading documents to be transmitted, reference numera 4a denotes a picture data memory, reference numeral 4 denotes a fixed data memory, reference numeral 4 denotes a fixed code memory, reference numeral 5 de notes a compressor/expander, reference numeral 6 denotes a printer, reference numeral 7 denotes a com munication control having functions of a transmitte and a receiver, reference numeral 8a denotes a mai control, and reference numeral 9 denotes a proces controller including a data conversion processing con trol and an operation processor 9b.

The control panel 2a has not only the function of th control 2 described in prior art, but also another func tion specified by an instruction button 22a and a plural ity of instruction buttons 23. The instruction button 22 specifies a reverse order printing mode wherein th received printing data is printed so as to start the prinl ing from the bottom line in respective pages. A pluralit of instruction buttons 23 are selected to specify th information which must be printed out from a pluralit of fixed information. The fixed information is a printin data for outputting a required message, for example, a a memorandum or a name of the facsimile station, irre spective of a printing output of receiving picture data The fixed data code memory 4c stores respectiv fonts (shape of the characters) and corresponding code thereof for making fixed information. The codes store in the fixed data code memory 4c can be selected one b one by using a plurality of instruction buttons 23 an fixed information such as the specific message or th facsimile station name can be arranged by repetition c the selection of the code by the instruction buttons 2: Usually, the specific message or the facsimile statio name is completed within one line. The picture data c the arranged fixed information is defined by the comb nation of the fonts selected by the codes.

The fixed data memory 4b stores a plurality of fixe information arranged by the instruction buttons 23 as compressed picture data. The compression of the pic ture data of the fixed information is activated by a dc line at the compressor/expander 5. The picture dat stored in the fixed data memory 4b is an upright imag data in this embodiment, but it may be an inverte image data by reversing the ordinary printing orders c top to bottom and left to right. In other words, variou kinds of message sentences are stored in the fixed dat memory 4b as a character row pattern nomally or b rotating the pattern by a 180 deg. angle.

The process controller 9 including data conversio processing control 9a and operation processor 9b ar activated to make the inverted image of the picture dat stored in picture data memory 4a and fixed data men ory 4b according to the instruction of the main contrc 8a.

The printer 6a is provided, for example, with a thei mal head which prints the printing data on the paper. A this time, the printer 6a prints the printing data in th same order as receiving the pinting data, that is, by first-in-first-out procedure.

The main control 8a, by controlling respective unit performs reading out of the documents, tranmitting an receiving, and printing the picture data. In particular, ; the time of depressing the specifying button 22a on th control panel 2a, the main control 8a controls the pic ture data memory 4a and the operation processor 9 and thereby causes conversion of the picture data. A the time of specifying a selection by depressing tł ifying buttons 23, the main control 8a reads out
d information such as a message, and causes such
rmation to print out.

he constitution and function of the embodiment
ording to the present invention has been described in
aforegoing. Now, the practical operation of one
odiment will be explained in detail according to the
chart shown in FIG. 4 which is a combination of
S. 4A, 4B, and 4C.

t step 401 it is determined whether or not the specig button 22a on the control panel 2a (in FIG. 4 it is
ten as "reverse button") is depressed to ON. If the
rse button is ON (YES), the control proceeds to
402 for setting a reverse flag RF to "1" and reverse
r printing mode is set. But if the reverse button is
ON (NO), the control proceeds to step 403 for
ng a reverse flag RF to "0" and a normal order
ting mode is set. The reverse order printing mode is
f the facsimile system 1a is installed on the wall so
the printing paper exits at the lower portion of the
mile device.

mediately after step 402 or 403, it is determined
ther or not the picture data is received at step 404.
e picture data is received, the control proceeds to
405 and if the picture data is not received, the
rol proceeds to step 401. At step 405 the picture
are received and the picture data as punctuated by
units are stored in the picture data memory 4a at
406. Then at step 407, it is determined whether or
a fixed data (fixed information) is selected by desing the specifying buttons 23. If the fixed data is
ted, the control proceeds to step 408 but if the fixed
is not selected, the control proceeds to step 412. At
408, it is determined whether or not the reverse flag
s "1". If RF ="1", the control proceeds to step 409
reverse order printing will be carried out after that,
if RF ="0", the control proceeds to step 422 and
normal order printing will be carried out afterward.
ne operation of reverse order printing will be exed first and the operation of normal order printing
be explained next.

) Reverse order printing fore the printing operation of the received picture
, the printing operation of the fixed data is activated
very page in this embodiment if the fixed data is
d in the fixed data memory 4b previously. Accord, at step 409, it is determined whether or not the
l data is stored in the fixed data memory 4b.

the fixed data is stored in the fixed data memory 4b
S), the control proceeds to step 410 and a reading
of the fixed data upward by dot line from the fixed
memory 4b is activated. But if the fixed data is not
d in the fixed data memry 4b (NO), the control
eeds to step 411 and a reading out of the picture
upward from the last dot line by line from the
re data memory 4a is carried out. The read out of
lata by a dot line unit from the last dot line of the
page stored in the picture data memory 4a or from
ast dot line of the fixed data of the fixed data memis carried out by data conversion processing control
response to an instruction from the main control fter steps 410 or 411, the control proceeds to step
and the fixed data or the picture data (both comsed) is expanded through the compressor/expander
t step 413, it is determined whether or not the ree flag RF is eqal to "1". If RF="1", the control
eeds to step 414 but if RF="0", the control proceeds to step 416. At step 414, the expanded fixed data
or the picture data is then sent to operation processor 9b
and an operation of reversing the bit order in dot lines
from left to right to right to left is carried out at step 415
by the method described later in this specification. The
reversed fixed data, the non-reversed fixed data, the
reversed picture data, or the non-reversed picture data
is transmitted to printer 6a for printing at step 416.

Then at step 417, it is determined whether or not the
reading of the fixed data is finished. If the reading of the
fixed data is not finished (NO), the control proceeds to
step 418 and it is determined whether or not the reverse
flag RF="1". The reverse flag RF="1" in reverse
order printing mode, so that the control proceeds to
step 410 and the operation of step 410 and steps 412 to
416 are repeated. But if the reading of the fixed data is
finished (YES) at step 417, the control proceeds to step
419 and it is determined whether or not there are unfinished lines left in the page. If there are lines left (YES),
the control proceeds to step 420 and it is determined
whether or not the reverse flag RF="1". The control
proceeds to step 411 and the operation of step 411 and
steps 412 to 416 are repeated, since the reverse flag
RF="1" in reverse order printing mode. But if there
are no lines left (NO) at step 419, that is, it is the top dot
line of the page, the control proceeds to step 421.

At step 421, it is determined whether or not there are
unfinished pages left in the picture data memory 4a. If
there are still some pages left in the picture data memory 4a (YES), the control proceeds to step 408 and the
operation described above is repeated, but if there is no
page left (NO), the operation of reverse order printing
will be completed at step 425.

(2) Normal order printing

This mode is set if the facsimile system 1a is not installed on the wall. In this mode, the reverse button 22a
is not depressed to ON, and the reverse flag RF="0" as
described before, so that the control proceeds to step
422 from step 408. Also in this normal printing mode,
the printing operation of the fixed data is activated for
every page in this embodiment if the fixed data is stored
in the fixed data memory 4b previously, before the
printing operation of the received picture data. Accordingly, at step 422, it is determined whether or not the
fixed data is storied in the fixed data memory 4b.

If the fixed data is stored in the fixed data memory 4b
(YES), the control proceeds to step 423 and a reading
out of the fixed data downward by dot line from the
fixed data memory 4b is activated. But if the fixed data
is not stored in the fixed data memry 4b (NO), the control proceeds to step 424 and a reading out of the picture
data downward line by line from the last dot line from
the picture data memory 4a is carried out.

After steps 423 or 424, the control proceeds to step
412 and the fixed data or the picture data (both compressed) is expanded by compressor/expander 5. At
step 413, it is determined whether or not the reverse flag
RF is equal to "1". If RF="1", the control proceeds to
step 414 but if RF="0", the control proceeds to step
416. At step 414, the expanded fixed data or the picture
data is then sent to operation processor 9b and an operation of reversing the bit order in dot lines from left to
right to right to left is carried out at step 415. The reversed fixed data, the non-reversed fixed data, the reversed picture data, or the non-reversed picture data is
transmitted to printer 6a for printing at step 416.

Then at step 417, it is determined whether or not the
reading of the fixed data is finished. If the reading of the fixed data is not finished (NO), the control proceeds to step 418 and it is determined whether or not the reverse flag RF is equal to "1". The reverse flag RF = "0" in normal order printing mode, so that the control proceeds to step 423 and the operation of step 423 and steps 412 to 416 are repeated. But if the reading of the fixed data is finished (YES) at step 417, the control proceeds to step 419 and it is determined whether or not there are unfinished lines left in the page. If there are lines left (YES), the control proceeds to step 420 and it is determined whether or not the reverse flag RF is "1". The control proceeds to step 424 and the operation of step 424 and steps 412 to 416 are repeated, since the reverse flag RF = "0" in normal order printing mode. But if there are no lines left (NO) at step 419, that is, it is the top dot line of the page, the control proceeds to step 421.

At step 421, it is determined whether or not there are unfinished pages left in the picture data memory 4a. If there are still some pages left in the picture data memory 4a (YES), the control proceeds to step 408 and the operation above described is repeated, but if there is no page left (NO), the operation of reverse order printing will be completed at step 425.

The above described operation is useful not only for a facsimile system but also for a line printer. Though in the case of a page printer where printing is performed in pages, a replacement process of the data in lines from left to right to right to left is required for an entire bit line before printing.

Figures 2, 5A:
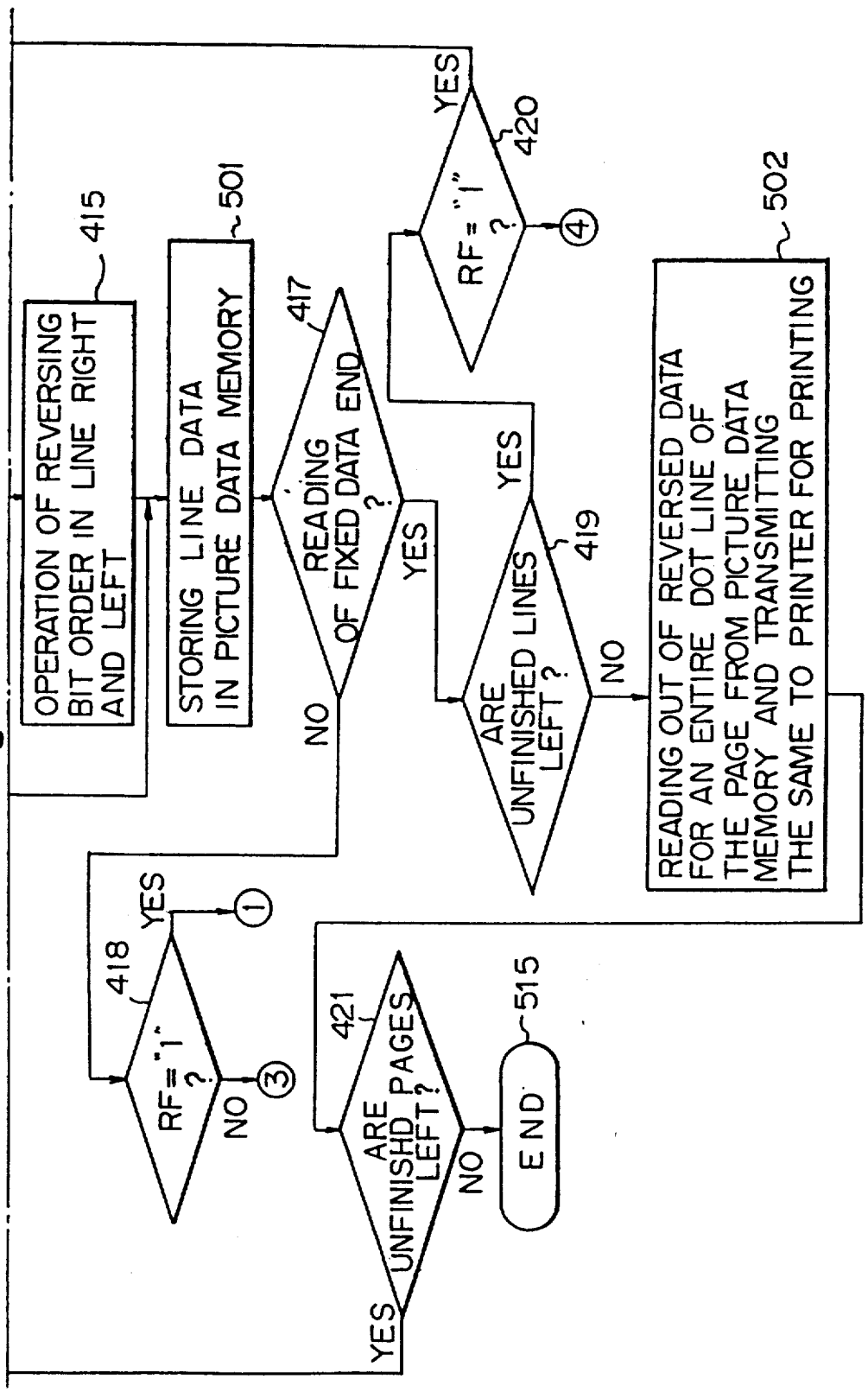

FIG. 5A which is a combination of FIGS. 5A-1 and 5B-2 is a modification of the flowchart shown in FIG. 4 for the page printer and the same reference numeral is given for the same step in FIG. 4. The difference between FIG. 4 and FIG. 5A is that step 416 is deleted and step 501 is added between steps 415 and 417, and step 502 is added between steps 419 and 421. In this routine, after the operation of reversing bit order in dot lines from left to right to right to left at step 415, storing the reversed and non-reversed line data in the picture data memory 4a is carried out at step 501. The storing operation at step 501 is carried out by dot line units according to the order read out at step 410 or 411. The operation of steps 417 to 420 after step 501 is the same operation as explained in FIG. 4, so that the reversed data of a whole page is stored in the picture data memory 4a when it is determined to be NO at step 419.

When it is determined NO at step 419, the control proceeds to step 502. At step 502, reversed data for an entire dot line of the page is read out from the picture data memory 4a and is transmitted to the printer 6a for printing. Then at step 421, it is determined whether or not there are unfinished pages left in the picture data memory 4a. If there are still some pages left in the picture data memory 4a (YES), the control proceeds to step 408 and the operation above described is repeated, but if there is no page left (NO), the operation of reverse order printing will be completed at step 515.

Figures 2, 5B:
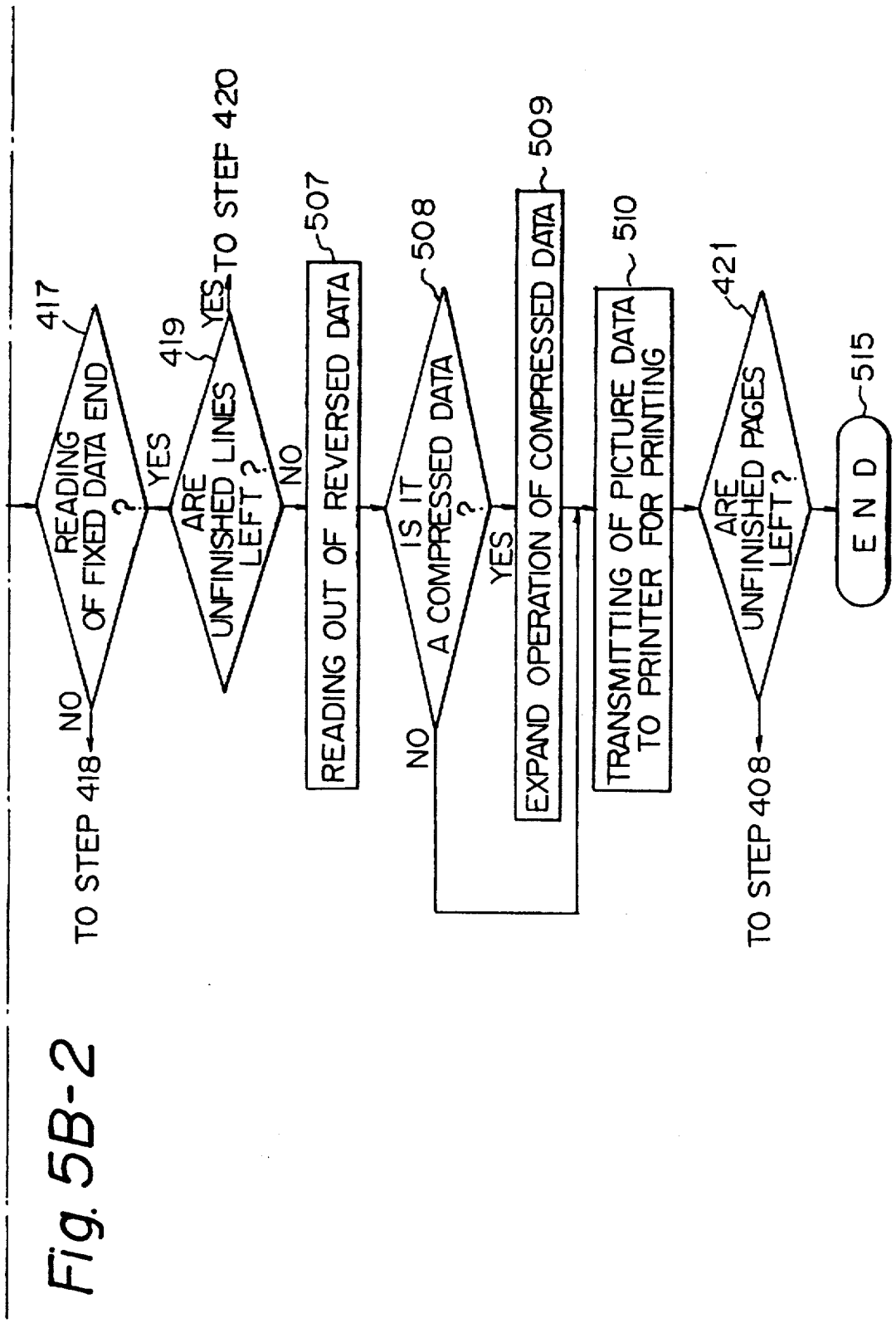

FIG. 5B which is a combination of FIGS. 5A-1 and 5B-2 is another modification of the flowchart shown in FIG. 4 and the same reference numerals are used for the same steps in FIG. 4. The difference between FIG. 4 and FIG. 5B is that step 416 is deleted and steps 503 to 506 are added between steps 415 and 417, and steps 507 to 510 are added between steps 419 and 421. In this routine, after the operation of reversing bit order in dot lines from left to right to right to left at step 415, it is determined whether or not the reversed data is required to be compressed. If the reversed data is required to be compressed, the control proceeds to step 504 and compressing of reversed line data is carried out, and the storing of the compressed reversed line data in the picture data memory 4a is carried out at step 505. However, if the reversed data is not required to be compressed, the control proceeds to step 506 and storing of the reversed line data in the picture data memory 4a is carried out. The storing operation at step 505 and 506 is carried out by dot line units according to the order read out at step 410 or 411. The operation of steps 417 to 42 after step 505 or 506 is the same operation as explained in FIG. 4.

When it is determined that there is no unfinished line left, reading of the reversed data is carried out at step 507. The data stored in the picture data memory 4a are read out in the same order in which the data was stored. After step 507, it is determined whether or not the data read out is a compressed data at step 508. If it is compressed data, the control proceeds to step 509 and an expand operation of the compressed data is carried out. However, if it is not compressed data, the control proceeds to step 510 directly. At step 510, transmitting of the picture data to printer 6a for printing is carried out.

Then at step 421, it is determined whether or not there are unfinished pages left in the picture data memory 4a. If there are still some pages left in the picture data memory 4a (YES), the control proceeds to step 40 and the operation above described is repeated, but there is no page left (NO), the operation of reverse order printing will be completed at step 515.

FIG. 5C is an another modification of the flow chart shown in FIG. 4. This routine is carried out to print on the fixed information selected by depressing one of the specifying buttons 23 such as a memorandum or a name of the facsimile station of the received data, irrespective of a printing output of receiving picture data.

At step 600, it is determined whether or not a list button which is one of the specifying buttons 23 is depressed (ON). If the list button is not ON, the control proceeds to step 601 and it is determined whether or not the picture data is received. If the picture data is received, the control proceeds to step 401 of FIG. 4 but the picture data is not received, the control proceeds to step 600. If the list button is ON at step 600, the control proceeds to step 602 and it is determined whether or not the fixed data is stored in the fixed data memory 4b. the fixed data is stored in the fixed data memory 4b, the control proceeds to step 603 but if the fixed data is not stored in the fixed data memory 4b, the control proceeds to step 600.

At step 603, it is determined whether or not the reverse flag RF is equal to "1". If RF = "0", the control proceeds to step 604 and normal order printing will be carried out after that, but if RF = "1", the control proceeds to step 605 and the reverse order printing will be carried out afterward. At step 604, a reading out of the fixed data downward by dot line from the fixed data memory 4b is activated and at step 605, a reading out of the fixed data upward by dot line from the fixed data memory 4b is activated. After steps 604 and 605, the fixed data or the picture data (both compressed) is expanded through the compressor/expander expander at step 606.

Then at step 607, it is determined whether or not the reverse flag RF is equal to "1". If RF = "1", the control proceeds to step 608 but if RF = "0", the control proceeds to step 610. At step 608, the expanded fixed da the picture data is then sent to operation processor 9b
d an operation of reversing the bit order in dot lines
om left to right to right to left is carried out at step 609
the method described later in this specification. The
versed fixed data, the non-reversed fixed data, the
versed picture data, or the non-reversed picture data
transmitted to printer 6a for printing at step 610.
Then at step 611, it is determined whether or not the
iding of the fixed data is finished. If the reading of the
ed data is not finished (NO), the control proceeds to
p 603 and steps 603 to 611 are repeated, but if the
iding of the fixed data is finished (YES) at step 611,
s routine is completed at step 612.

Figure 6:
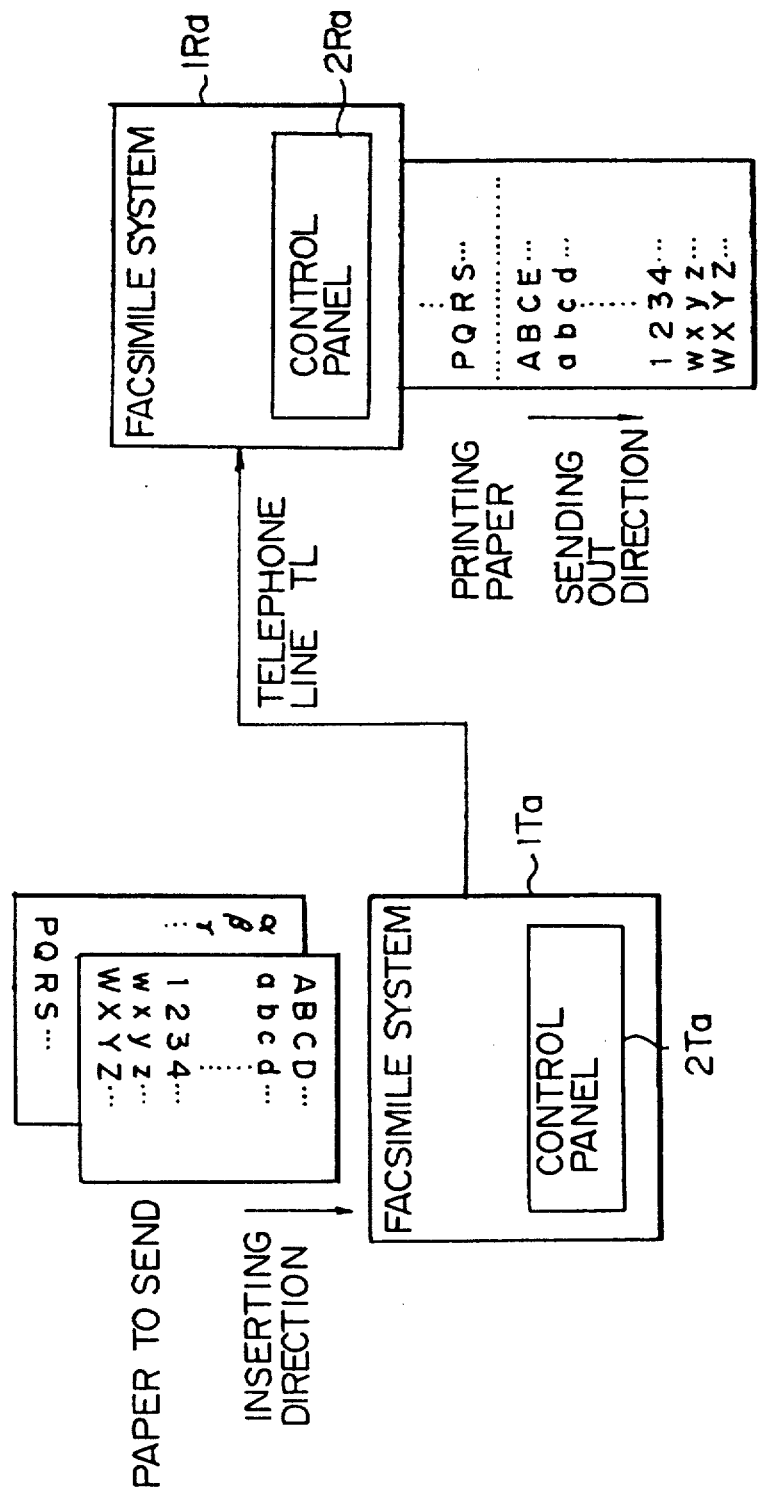
FIG. 6 is an illustration of an embodiment showing the facsimile system according to the present invention.
Figure 8:
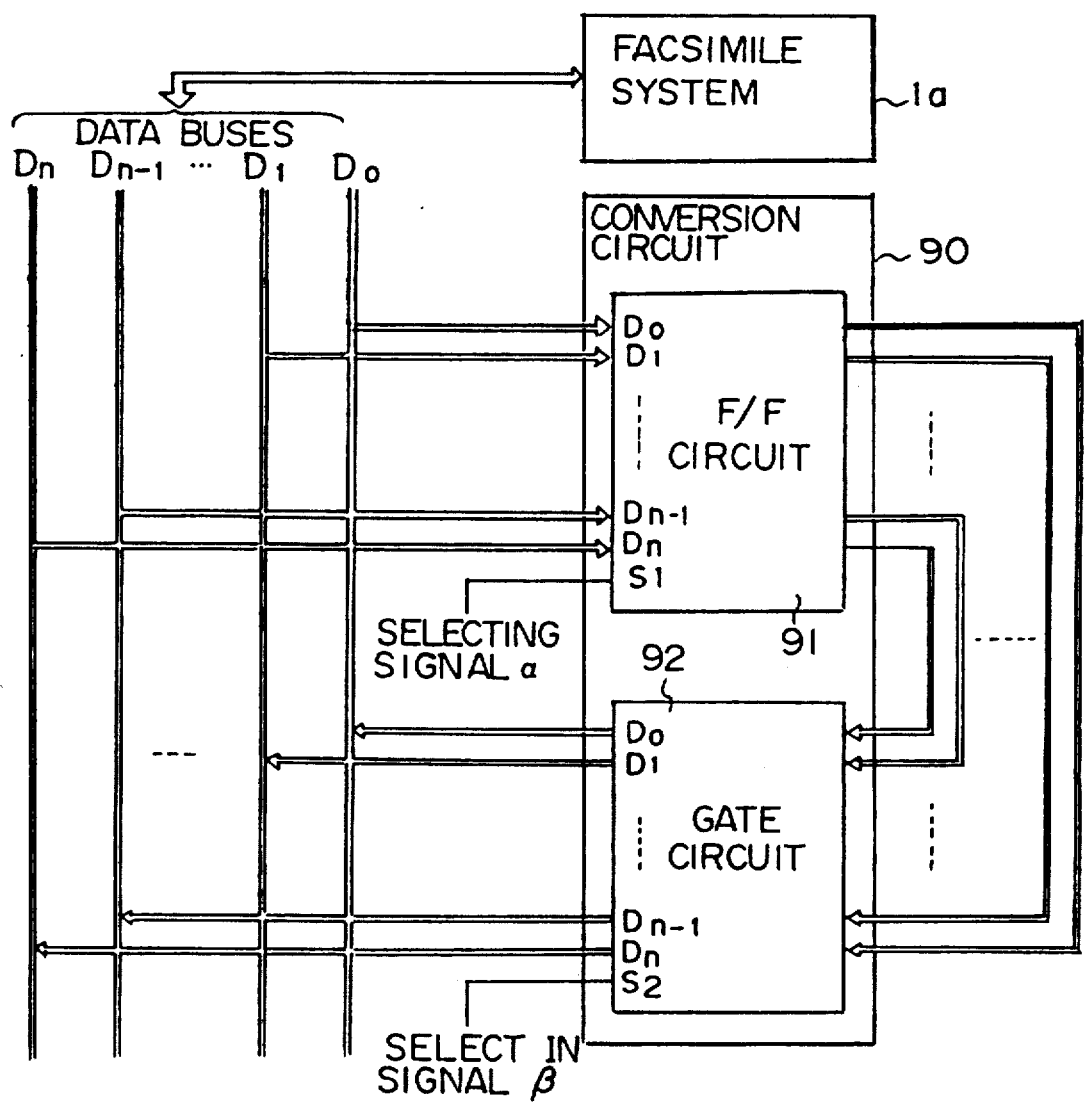
FIG. 8 is a block diagram illustrating a data reversing circuit according to the present invention.

FIG. 6 is an illustration for explaining the data trans-
ission between a facsimile transmitter and a receiver
own in FIG. 3 according to the present invention via
elephone line TL. From the above described consti-
ion and operation, if documents are put in the reader
and a called telephone number is input by dialing
ough the use of the ten-key key pad 20 on the control
el 2a of the facsimile trnsmitter 1Ta, the addressed
e facsimile receiver 1Ra is called. When the facsimile
nsmitter 1Ta and the addressed facsimile receiver
a are connected via the telephone line TL, a transmi-
n button is depressed to transmit the documents. In
 manner, on completion of the procedure in advance
transmitting/receiving, the reader 3 starts to read
documents, the thus input picture data is temporar-
stored in the picture data memory 4a (or as com-
ssed at the compressor/expander). Then, the tempo-
ly stored picture data is sequentially read out to be
t directly to the compressor/expander 5 at respec-
 lines (or the already compressed stored picure data
ses the compressor/expander 5). The resultant com-
ssed picture data is divided into lines, blocks, or
es, and delivered from the communication control 7
 receiver side.

he facsimile receiver 1Ra receives the picture data
he communication control 7 to then temporarily
e the data in the picture data memory 4a (the re-
'ed picture data is divided into lines, blocks, or
es). The printing operation of the received data is
erent whether or not the fixed data is stored in the
d data memory 4b and whether or not the instruc-
button (reverse button) 22a is depressed. Here, an
lanation will be given for a case where the instruc-
button (reverse button) 22a is depressed, referring
'IG. 6.

'hen the reverse button 22a is depressed, the stored
ure data is sequentially read out upward from the
line of every page by line units, expanded at the
pressor/expander 5, and transmitted to the printer
rom the bottom line of every page. Accordingly, in
above described operation, the picture data is
ted on the printing papers in the reverse order as
of reading from the original documents as shown in
. 6 and the printing papers are sent out from the
er part of the facsimile system 1Ra.

the facsimile system according to the present in-
ion, the received data is printed as shown in FIG. 6
e reversed order of the original documents. Ac-
ingly, when the original documents are read from
op end of the pages and when the facsimile receiver
s installed on the wall, the printed papers are sent
hanging down from the facsimile receiver, and the
ted documents appear from the bottom of the page
 the characters in an upright position, and thereby
it in easy reading. In particular, if rolled paper is
sent out without being cut, it is quite easy to check the
papers without the drawback of operators having to
twist the printed documents or to twist their body or
neck.

Further, according to the present invention, when the
specifying button 23 is depressed for specifying and
selecting while a facsimile system 1a is not performing
both transmitting and receiving, from the fixed data
code memory 4c are derived corresponding message
codes, and from a fixed data memory 4b a character
pattern row of a message corresponding to the codes is
read-out. Thus derived and read-out data is sent to the
printer 6a to be printed out on papers, and may issue a
message memorandum. In this case, if the reverse but-
ton 22a is depressed, the character pattern row of the
message can be printed in the reversed order of top and
bottom/left and right, in accordance with the operation
described above, so that the character row is aligned in
the normal direction to thereby appear correctly in the
printing papers.

FIGS. 7 to 11C show the operation of the operation
processor 9b. As is explained before, the picture data in
bit lines are delivered from the data conversion process-
ing control 9a to the operation processor 9b, and then
the operation processor 9b sends the data of respective
lines to the data conversion processing control 9a in
such a way that a bit arrangement in bit lines is subject
to an operation for reversing the bit arrangement order
from left to right to right to left.

FIG. 7 shows one method of the above described
operation which will be explained as follows.

(STEP1) Assuming one bit line of, for example, 8 bits
of A to H (A to H show 1 or zero), (STEP 2) in order to position the left end A at the 8th
bit in the right end, A is shifted by 7 bits to the right,
where the respective empty portions are zero (hereinaf-
ter referred to as the same).

(STEP 3) Next, in the same manner, to position B at
the 7th bit, B is shifted by 5 bits to the right.

(STEP 4) Assuming that the position corresponding
to B is 1, and that the other positions are zero, (STEP 5) where a logical AND of STEP 3 and STEP
4 is made, (STEP 6) and where a logical OR of STEP 5 and
STEP 2 is made, and consequently A and B are aligned
in reversed order.

(STEP 7) Nest, in the same manner, to position C at
the 6th bit, B is shifted by 3 bits to the right.

(STEP 8) Assuming that the position corresponding
to C is 1, and that the other positions are zero, (STEP 9) where a logical AND of STEP 7 and STEP
8 is made, (STEP 10) and where a logical OR of STEP 9 and
STEP 6 is taken, and consequently A and C are aligned
in reversed order.

The same operation procedure is performed in the
whole corresponding bit line by converting the align-
ment order of A to H to H to A. Further, this procedure
is applied to the respective bit lines at every line of the
delivered picture data. The respective bit lines of the
picture data thus enter the operation processor 9b in an
order starting from the top bit line and ending at the
bottom bit line thereof. Then, the other bit lines are also
subject to operation in the same manner, and subse-
quently the picture data of one page are converted
squentially in bit lines.

FIGS. 8, 9A, 9B and 10A to 10E show another re-
versing method of the above described operation. FIG.

8 is a conversion circuit 90 comprising a flip-flop (hereinafter referred to as F/F) circuit 91 and a gate circuit 92. Input terminals of the F/F circuit 91 are connected with buses Do to Dn in use for control signals and picture data flows from the facsimile system 1a. Output terminals of the gate circuit 92 are connected with buses Do to Dn in use for control signals and picture data flows to the facsimile system 1a. Output terminals of the F/F circuit 91 and input terminals of the gate circuit 92 are connected to reverse the data order.

FIGS. 10A to 10E show a timing diagram showing the operation of the conversion circuit 90. FIG. 10A shows a clock signal, FIG. 10B shows a line data flow in the buses Do to Dn, FIG. 10C shows a reversed data output from the gate circuit 92, FIG. 10D shows the selection signal α to be input to the F/F circuit 91, and FIG. 10E shows the selection signal β to be input to the gate circuit 92. The picture data is written in the F/F circuit 91 from the buses Do to Dn when the selecting signal α is input to a terminal S1 to be temporarily held. The picture data held in the F/F circuit 91 is input to the gate circuit 92, so that the picture data is output from the gate circuit 92 when the selecting signal β is input to a terminal S2 by reversing the top and bottom of the bit data information to the buses Do to Dn. Therefore, a line of picture data is obtained, through processing from the lowest line of the page, by converting the picture data of one bit line to the reversed position, and by reversing alignment of left and right of a bit line. The obtained data is transmitted to the printer later.

For example, in the case of 8 bit buses as shown in FIG. 9A, 1 byte which is positioned at the leftmost of bit line 1 is input in the F/F circuit 91. Then, by means of reading-out the input data from the gate circuit 92, the above 1 byte data is output in reverse order of left and right in lines. The above data is accumulated as is, and in the same manner, succeeding data at every byte are also sequentially accumulated in reverse order of left and right. In this way, as shown in FIG. 9B, the data of 1 byte units within a bit line are processed by reversing the alignment order of left and right. The processed data is sent to the printer 6a sequentially from the first 1 byte data within the bit line.

Figure 11A:
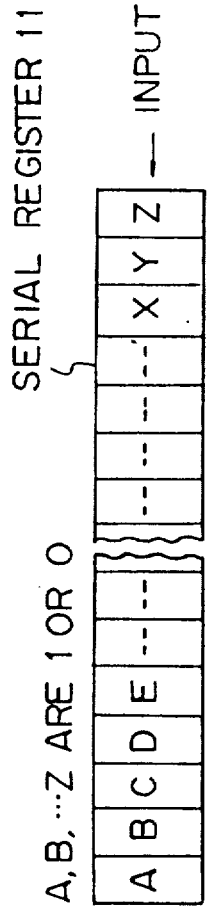
FIGS. 11A to 11C are illustrations showing another modified embodiment of a reversing operation according to the present invention.
Figure 11B:
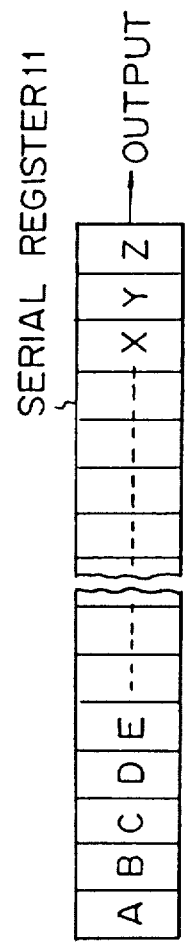
Figure 11C:
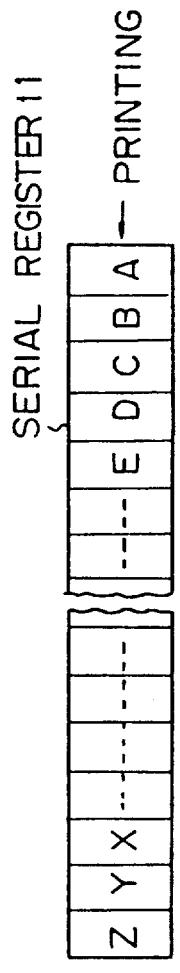

FIGS. 11A to 11C show another reversing method of the above described operation. Referring to FIG. 11A, a serial register 11 is provided. After a bit line of picture data is input in the serial register 11, by means of outputting so as to reverse a higher bit and a lower bit with each other, the picture is input at every bit line in the serial register 11 sequentially from the lowest line of the page as shown in FIG. 11A. After completion of the above described input, the data is output in reversed order (that is, first-in-last-out procedure) from the serial register 11 as shown in FIG. 11B. Then, as in FIG. 11C, the data is arranged in the reversed order of before and behind. This becomes a printing direction. In the same manner, sequentially, conversion is made at every bit line by reversing the order of top and bottom in bit line arrangement. Thus, one line of picture data can be printed by reversing top and bottom/left and right.

As a consequence, the printing direction of character row in the documents sent out downwardly, becomes normal and exhibits better readability seen by the receiving side users, for example, in the case that the facsimile system 1a is installed on the wall.

For the reason described in the aforegoing, according to the positioning condition of the facsimile system 1a, the users can freely select the method for printing out for easier watching and handling.

In the aforegoing embodiments, recording and printing in the receiver of the facsimile system has been described. This can generally be applied to a printer where printing data is printed on a page unit basis.

As described in the aforegoing explanation, with reference to the present invention, the advantages are obtained in the case that printed papers are sent out hanging down from an exit portion of a system. The effect of the invention is that, by reversing the order of top and bottom in pages and left and right in lines in printing data, and by printing the printing data in the order starting from the lowest line of document pages, users can freely select a printing method for easier reading and handling according to a positioning condition of the system.

I claim:

1. A printer capable of printing data upward from a last line of a page to a first line of the page on a printing medium, comprising: print specifying means for specifying a printing mode of the page, including an upright image printing mode for printing downward from the first line of the page and a reversed image printing mode for printing upward from the last line of the page;
   printing data storing means including a storage region which is connectable to receive data, for storing at least one page of data in dot line units;
   printing data reading means for reading the one dot line units from said printing data storing means and for providing the one dot line units as second data;
   reading direction specifying means for specifying an order to read the dot line units from said printing data storing means in accordance with the printing mode;
   printing data processing means for providing printing data by reversing the second data from first to last to last to first when the reversed image printing mode is selected;
   character storing means for storing fixed data;
   fixed data forming means for selecting a portion of the fixed data;
   fixed data storing means for storing the portion;
   fixed data reading means for reading the portion from said fixed data storing means;
   fixed data processing means for reversing the portion read by said fixed data reading means from said fixed data storing means, when the reversed image printing mode is selected; and
   printing means for printing the printing data and the portion of the fixed data on the printing medium.

2. A printer as set forth in claim 1, wherein said printing data storing means comprises
   means for receiving compressed data; and
   printing data expanding means for expanding the compressed data.

3. A printer as set forth in claim 1, wherein said printing data processing means includes:
   means for receiving a first trigger signal and a second trigger signal;
   data latching means for latching the printing data in a first order when the first trigger signal is received; and
   gate means for reversing the first order by outputting the printing data in reversed order by opening gate when the second trigger signal is received.

4. A printer as set forth in claim 1, wherein said printing data processing means comprises:

serial register for storing and providing the printing data with a first-in-last-out procedure.

A printer capable of printing data on a page having [fir]st line and a last line, upside down and reversed left [to r]ight for every page on a printing medium, comprising:

[p]rint specifying means for specifying a printing mode of the page, including an upright image printing mode for printing downward from the first line of the page and a reversed image printing mode for printing upward from the last line of the page;

[p]rinting data storing means including a storage region which is connectable to receive data, for storing at least one page of data in dot line units

[p]rinting data reading means for reading the one dot line units from said printing data storing means and for providing the one dot line units as second data;

[re]ading direction specifying means for specifying an order to read the dot line units from said printing data storing means in accordance with the printing mode;

[p]rinting data processing means for providing printing data by reversing the second data from first to last to last to first when the reversed image printing mode is selected;

[pa]ge data storing means for storing a page of the printing data line by line at least for one page;

[pa]ge data reading means for reading the printing data of one page from said page data storing means;

[ch]aracter storing means for storing fixed data;

[fix]ed data forming means for selecting a portion of the fixed data;

[fix]ed data storing means for storing the portion;

[fix]ed data reading means for reading the portion from said fixed data storing means,

[fix]ed data processing means for reversing the portion read by said fixed data reading means from said fixed data storing means, when the reversed image printing mode is selected; and

[pa]ge printing means for printing the printing data and the portion of the fixed data one page at a time on the printing medium.

6. A printer as set forth in claim 5, wherein said printing data storing means comprises:
   means for receiving compressed data; and
   printing data expanding means for expanding the compressed data.

7. A printer as set forth in claim 5, wherein said printing data processing means includes:
   means for receiving a first trigger signal and a second trigger signal;
   data latching means for latching the printing data on in a first order when the first trigger signal is received; and
   gate means for reversing the first order by outputting the printing data in reversed order by opening a gate when the second trigger signal is received.

8. A printer as set forth in claim 5, wherein said printing data processing means comprises:
   a serial register for storing and providing the printing data with a first-in-last-out procedure.

9. A printer as set forth in claim 5, further comprising:
   data compressing means for compressing the printing data by dot lines units from said data processing means;
   compressed data storing means for storing the compressed data for at least one page;
   compressed data reading means for reading a page of the compressed data stored in said compressed data storing means; and
   data expanding means for expanding the compressed data read by said compressed data reading means.

10. A printer as set forth in claim 9, wherein said printing data processing means includes:
    means for receiving a first trigger signal and a second trigger signal;
    data latching means for latching the printing data on in a first order when the first trigger signal is received; and
    gate means for reversing the first order by outputting the printing data in reversed order by opening a gate when the second trigger signal is received.

11. A printer as set forth in claim 9, wherein said printing data processing means comprises:
    a serial register for storing and providing the printing data with a first-in-last-out procedure.

* * * * *

UNITED STATES PATENT AND TRADEMARK OFFICE
CERTIFICATE OF CORRECTION

PATENT NO. : 5,018,080
DATED : May 21, 1991
INVENTOR(S) : Inoue

It is certified that error appears in the above-identified patent and that said Letters Patent is hereby corrected as shown below:

- Col. 1, line 13, change "hereinafter" to

--(hereinafter--;

Col. 1, line 62, after "printing" insert

--data storing means, when the reversed image printing--;

Col. 5, line 67, change "eqal" to --equal--;

Col. 12, line 21, before "print specifying"

insert NEW PARAGRAPH;

Col. 12, line 53, change "comprises" to

--comprises:--;

Col. 13, line 15, change "units" to --units;--.

Signed and Sealed this

Nineteenth Day of January, 1993

*Attest:*

DOUGLAS B. COMER

*Attesting Officer*　　　　*Acting Commissioner of Patents and Trademarks*